Oct. 31, 1933.    R. D. WEYERBACHER    1,932,430
AIRPLANE CONSTRUCTION AND THE METHOD OF FABRICATING THE SAME
Filed Oct. 3, 1931    2 Sheets-Sheet 1
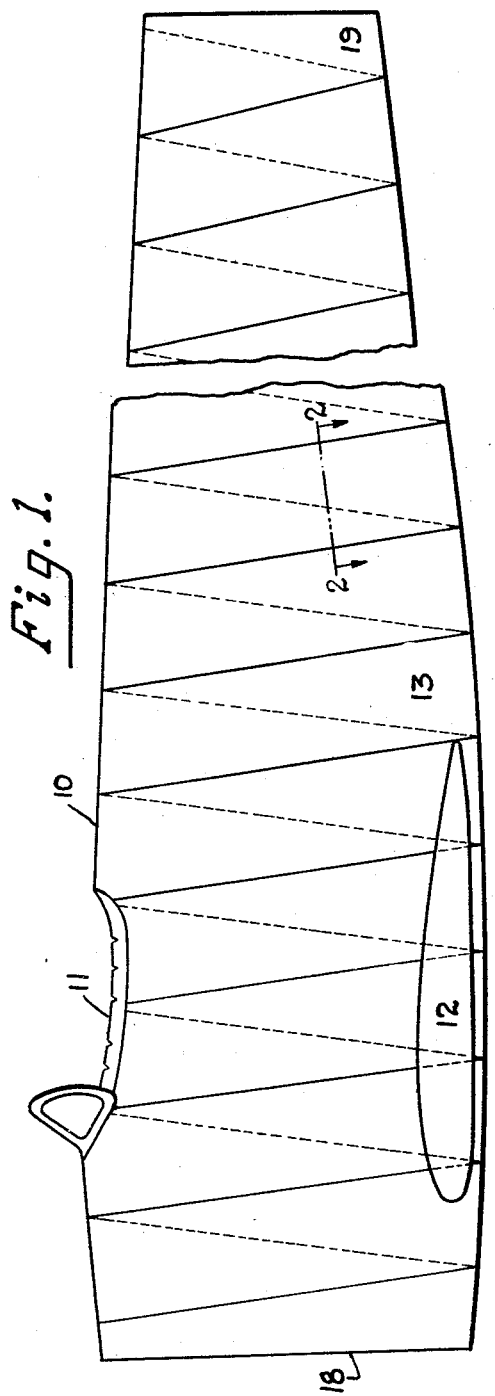
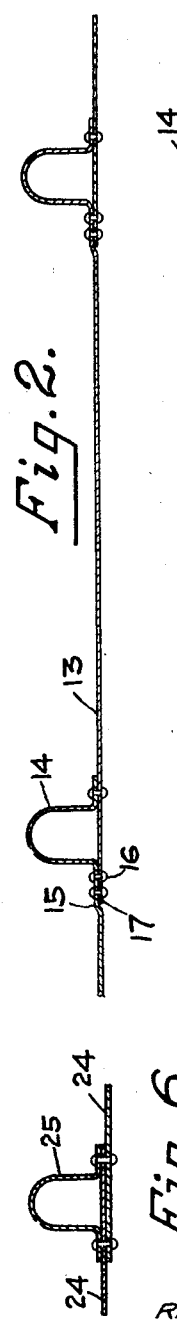
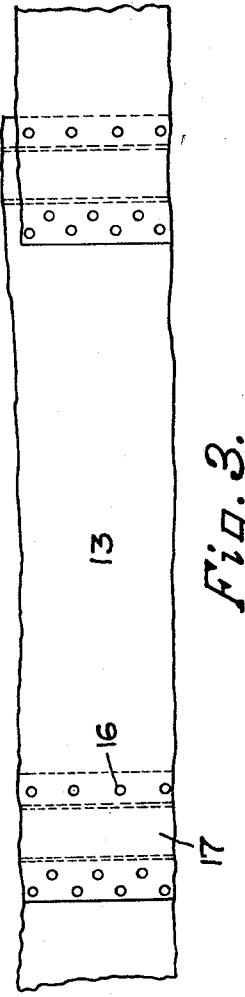
RALPH D. WEYERBACHER
INVENTOR
BY
ATTORNEY Oct. 31, 1933. R. D. WEYERBACHER 1,932,430
AIRPLANE CONSTRUCTION AND THE METHOD OF FABRICATING THE SAME
Filed Oct. 3, 1931 2 Sheets-Sheet 2
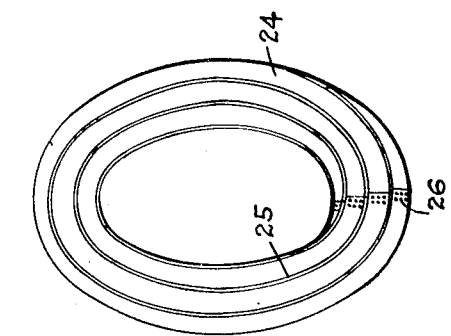
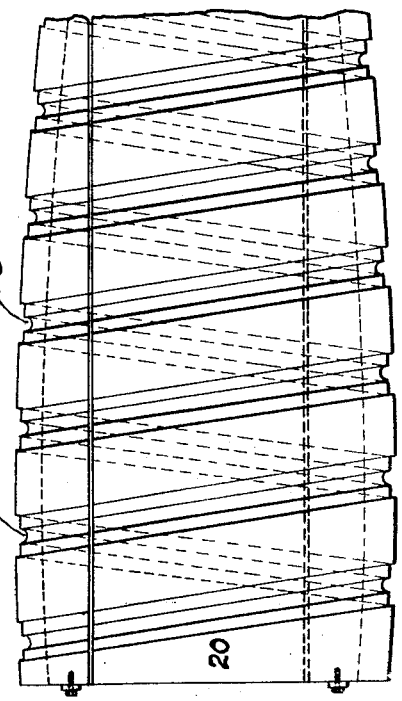
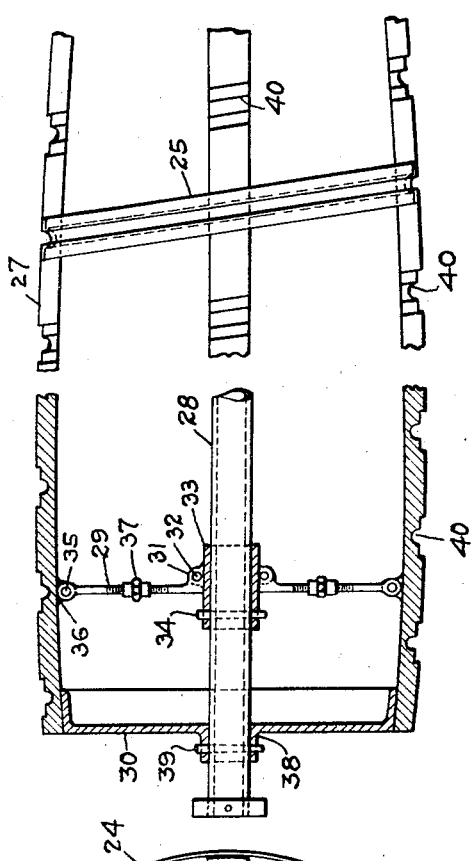
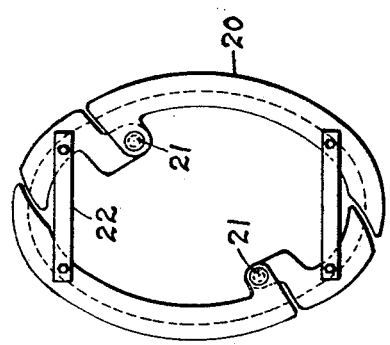
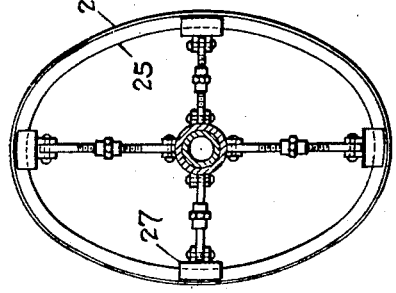
RALPH D. WEYERBACHER
INVENTOR
BY *Robert A. Lavender*
ATTORNEY Patented Oct. 31, 1933

1,932,430

UNITED STATES PATENT OFFICE 1,932,430

AIRPLANE CONSTRUCTION AND THE METHOD OF FABRICATING THE SAME

Ralph D. Weyerbacher, United States Navy

Application October 3, 1931. Serial No. 566,691

12 Claims. (Cl. 244—30)

(Granted under the act of March 3, 1883, as amended April 30, 1928; 370 O. G. 757)

My invention relates broadly to an airplane construction and more particularly to the building of a spiral wound fuselage for an aircraft.

The primary object of my invention is to fabricate a spiral wound fuselage for an aircraft from a sheet of metal without utilizing the conventional type longeron and strut members.

Another object of my invention is to provide in a sheet of metal making up a spiral wound fuselage, an integral bead or stiffener at the places where the sheet metal overlaps in forming the spiral.

A further object of my invention is to provide in the construction of a spiral wound fuselage of an airplane, a spiral stiffener or bead member for supplying longitudinal and transverse strength to the entire structure.

Another object of my invention is to construct an airplane fuselage of helical plate sections secured to a spiral wound reinforcing member at the point where two of the sections are joined together.

It is also an object of my invention to fabricate a fuselage that is rugged, of light weight and well reinforced without the use of longeron and strut members.

With the above and other objects in view, the invention consists in the construction, combination and arrangement of parts as will be described more fully hereinafter.

Reference is to be had to the accompanying drawings forming a part of this specification, in which like reference characters indicate corresponding parts throughout the several views, and in which:

Fig. 1 is a side elevation of my improved fuselage;

Fig. 2 is a section taken on line 2—2 of Fig. 1;

Fig. 3 is a detail section of my improved fuselage;

Fig. 4 is a side elevation showing a portion of a jig for constructing my improved fuselage;

Fig. 5 is an end view of Fig. 4;

Fig. 6 is a detail section of a modified form of my improved fuselage;

Fig. 7 is a side elevation, partly in section, of a jig for constructing the modified form of my improved fuselage;

Fig. 8 is an end view of Fig. 7;

Fig. 9 is an inside view of a portion of the modified form of my improved fuselage.

Referring more particularly to the drawings, 10 indicates a fuselage of an airplane having cockpit 11 therein and conventional wing 12 secured thereto. The fuselage 10 is constructed by spirally winding a long, relatively narrow sheet of metal 13, preferably duralumin, with slightly overlapping turns to produce a tapering structure of decreasing elliptical section. A stiffener or reinforcing bead 14 is integrally pressed, shaped, or formed in an offset side 15 of the sheet 13 so that when the successive turns of the spiral are riveted together by rivets 16 along the overlap 17, the bead 14 extends inward and forms a part of the joint while the offset side 15 permits a continuous surface. The forward end of the spirally wound sheet is sheared off to form a vertical front edge 18 to which the engine cowl, not shown, is secured. Riveted to the rear end of the fuselage 10 is a tail section 19 which is cut on an angle to conform to the spiral of the metal sheet 13. I desire it to be understood that the bead 14 may be an independent member with the spirally wound sheet of metal secured to it.

In building up my spirally wound fuselage, I utilize a collapsible jig or form, as shown in Figs. 4 and 5, that has the shape of the finished product. This form is made up of a number of longitudinal units 20, either of wood or metal, movably secured together by means of hinges 21 and straps 22. Cut into the outer surface of the units 20 is a continuous spiral groove 23 adapted to receive and hold in place the bead 14 while the sheet of metal 13 is being wound around the form.

In fabricating the fuselage 10, the bead 14 and offset side 15 are first pressed or formed into the sheet 13. The sheet is then spirally wound into shape around the jig with bead 14 extending into groove 23. After this operation, the jig is removed and the sheet in the spiral shape is made secure by riveting along the overlapped portions thereof. The resultant body is then vertically sheared at the forward end for the engine cowl and the tail member is riveted to the rear of the body. Openings are suitably cut into the fuselage for the cockpit 12.

Figs. 6, 8 and 9 show a modified form of my improved fuselage wherein helical sections of sheet metal are secured together, and attached to an independent stiffener or U reinforcing member 25. In this modification, plates 24 which vary slightly in size and make-up one complete section or turn of the fuselage are joined together by placing the rear portion of one of the plates 24 in under the forward portion of the succeeding plate and then riveting the resulting lap joint to the stiffener 25. Each of the plates overlap at the bottom and are riveted as at 26.

To build the modified fuselage, a suitable jig or form as shown in Figs. 7 and 8 is utilized. This form comprises longitudinal units 27, a central spindle 28, arms 29 and a movable bulkhead 30 for holding the units 27 in position. One end of the arms 29 is hinged by means of ears 31 and pins 32 to adjustable collars 33 that are movably mounted around the spindle 28 and can be secured in position by wedge pins 34. The other ends of the arms 29 are pivoted by pins 35 to ears 36 on the under side of units 27 and to vary the position of the units 27, the arms 29 are preferably of two sections joined together by a turnbuckle 37. The bulkhead 30 is movably secured to the spindle 28 by means of a collar 38 and wedge pin 39 passing through the collar and spindle. Grooves 40 for receiving the reinforcing member 25 are suitably spaced and cut into the units 27.

In making up the modified form of fuselage, the jig is first set up and then the member 25 is spirally wound around the jig so as to properly fit into the grooves 40 of the units 27. The plates 24 are next rolled into shape and placed around the form. Each plate as it is placed is riveted to the succeeding plate and to the member 25. After all the plates are secured, including the front plate and the tail plate, the jig is removed and the cockpits are then cut into the top of the completed fuselage.

It will be understood that the above description and accompanying drawings comprehend only the general and preferred embodiment of my invention and that various changes in construction, proportion and arrangement of parts may be made within the scope of this invention and the appended claims, without sacrificing any of the advantages thereof.

The herein described invention may be manufactured and used by or for the Government of the United States for governmental purposes without the payment to me of any royalties thereon or therefor.

What I claim is:

1. A fuselage for an aircraft comprising a spirally wound sheet of metal having reinforcing means integral therewith.

2. A fuselage for an aircraft comprising a spirally wound sheet of metal having a stiffener on its inner surface and integral therewith.

3. A fuselage for an aircraft comprising a spirally wound sheet of metal having overlapping edges and a bead member on the inner edge of the overlap to act as a stiffener for the resultant body.

4. A fuselage for an aircraft comprising a spirally wound sheet of metal having its edges overlap, means securing the overlapped portions together, and a stiffening member on the inner surface of the secured overlapped portions as a longitudinal and lateral reinforcement for the entire body.

5. The method of making a fuselage for an aircraft consisting in offsetting one edge of a sheet of metal, forming a bead in said offset portion, then spirally winding said sheet of metal with slightly overlapping turns and securing the resultant body at the places where the sheet of metal overlaps, and then shearing off the forward end to make a vertical edge for the engine mounting.

6. The method of making a fuselage for an aircraft consisting in offsetting one edge of a sheet of metal, forming a bead in said offset portion, then spirally winding said sheet of metal around a collapsible jig to produce a tapering structure of decreasing elliptical section, removing said jig and securing the resultant body around the overlapped joint of the sheet metal, and then cutting a suitable hole in the top thereof for a cockpit.

7. The method of making a fuselage for an aircraft consisting in offsetting one edge of a relatively long sheet of metal, forming a bead in said offset portion, then spirally winding said sheet of metal with slightly overlapping turns having said bead on the inside of the overlapped portion as a stiffener for the lap joint and then riveting said joint to form a continuous body of decreasing elliptical section.

8. A fuselage for an aircraft comprising a spirally wound sheet of metal having overlapping edges, a bead reinforcing the overlapping edges, and means securing said overlapping edges to the bead.

9. A fuselage for an aircraft comprising a spirally wound U-shaped stiffener, helical sections of sheet metal, and means securing said sections to the U stiffener.

10. The method of making a fuselage consisting in spirally winding a bead reinforcing member into a groove around a jig, then spirally winding a relatively long sheet of metal with slightly overlapping turns around the jig so that the overlapped portions of the sheet metal will be in juxtaposition to said bead member, then securing portions of the overlap to the bead member, removing said jig and finishing the overlap joint and finally cutting one or more cockpits into the complete fuselage.

11. The method of making a fuselage consisting in spirally winding a bead reinforcing member into a groove in a jig, rolling helical plate sections and placing said sections around the jig so that the rear portion of the plates is in under the forward portion of the succeeding plate, securing said plates to the bead member and forming an overlap joint at the bottom of each plate, said joint also being firmly secured together.

12. A fuselage for an aircraft, comprising a spirally wound sheet of metal having overlapping edges, a stiffening member spirally wound in the same direction as said sheet of metal and abutting the under side of the overlapped portion, and means securing the overlapping edges to said stiffening member.

RALPH D. WEYERBACHER.